United States Patent [19]
Goserud

[11] 3,715,874
[45] Feb. 13, 1973

[54] LAWN MOWER CUTTERS

[76] Inventor: Chester O. Goserud, 3205 Woodbridge Street, St. Paul, Minn. 55112

[22] Filed: Oct. 1, 1971

[21] Appl. No.: 185,541

[52] U.S. Cl. .................................................. 56/295
[51] Int. Cl. ............................................... A01d 55/18
[58] Field of Search .............. 56/295, 255, 256, 17.5

[56] References Cited

UNITED STATES PATENTS

| | | | |
|---|---|---|---|
| 2,856,747 | 10/1958 | Kolls | 56/295 |
| 2,998,689 | 9/1961 | Boesch, Jr. | 56/12.7 |
| 3,203,161 | 8/1965 | Breisch et al. | 56/295 |
| 2,484,511 | 10/1949 | Ingalls | 56/295 |
| 3,247,657 | 4/1966 | Scarnato et al. | 56/295 |
| 2,654,986 | 10/1953 | Gold | 56/295 |
| 2,716,323 | 8/1955 | Ford | 56/295 |
| 3,621,642 | 11/1971 | Leake, Jr. | 56/295 |
| 2,891,369 | 6/1959 | Rietz | 56/295 X |
| 3,183,655 | 5/1965 | Dunlap et al. | 56/295 |
| 3,452,524 | 7/1969 | Guetterman | 56/295 |

FOREIGN PATENTS OR APPLICATIONS

| | | | |
|---|---|---|---|
| 221,980 | 6/1959 | Australia | 56/295 |
| 237,877 | 3/1962 | Australia | 56/295 |
| 950,438 | 2/1964 | Great Britain | 56/295 |

*Primary Examiner*—Russell R. Kinsey
*Attorney*—Alex Lagaard

[57] ABSTRACT

A lawn mower cutter having a rotatable body and a plurality of cutting units with sharpened edges and object striking ends pivoted thereto and adapted to swing outwardly by centrifugal force, said units being adapted to swing inwardly of the peripheral edge of said body to protective areas of the body where the cutting edges of said units are within the protective areas of the body, said body having marginal undulating edges defining the protective areas and forming projections serving to engage objects and shift the same outwardly.

3 Claims, 3 Drawing Figures

PATENTED FEB 13 1973
3,715,874
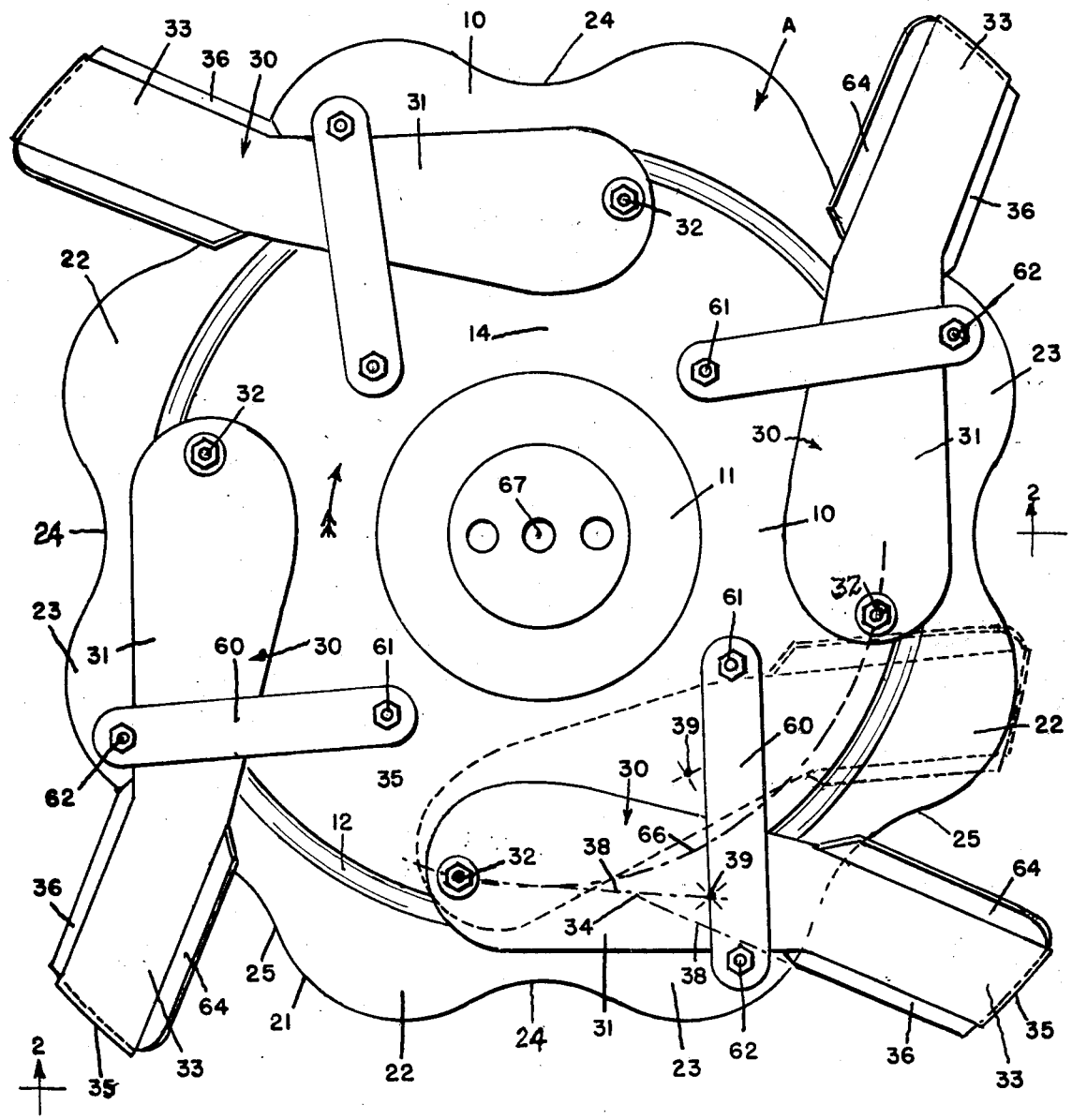
FIG. 1
FIG. 2
FIG. 3
INVENTOR.
CHESTER O. GOSERUD
BY
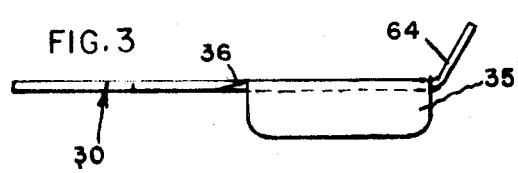
ATTORNEY

LAWN MOWER CUTTERS

FIELD OF THE INVENTION

The invention relates to lawn mower cutters of the vertical axis type and provides a cutter in which the cutting units are forced outwardly by centrifugal force for cutting action and are forced inwardly within protective areas of the body on which they are mounted when striking objects resisting cutting.

In the drawings:

FIG. 1 is a plan view of the cutter embodying the instant invention and removed from the lawn mower with which it is to be used and drawn to a reduced scale.

FIG. 2 is a sectional view taken on line 2—2 of FIG. 1.

FIG. 3 is an end view of one of the cutting units of the invention drawn to a greater scale.

The cutter utilizing the invention is indicated by the reference character A and embodies a body 10 constructed of sheet metal in the form of a disc. This body has a hub 11 pressed upwardly from the center of the same to space the marginal portion 14 of the cutter from the adjacent portion of the lawn mower, which mower has not been shown. An annular depression 12 in the body 10 forms a bead 13 in the same which stiffens and strengthens the body.

The outer edge 21 of body 10 is undulating in form providing alternating rounded projections 22 and 23 and similar depressions 24. The projections 22 have curved leading edges 25. These edges serve to move objects, which cannot be cut, out of the path of the mower. In the particular lawn motor cutter illustrated, eight projections have been shown though any even number would serve the purpose.

Mounted on the body 10 are a number of cutting units 30 which are of identical construction. These units include supporting arms 31 which are pivoted at one end to the body 10 by means of bolts 32. Extending outwardly from the other ends of arms 31 are blades 33 which have rounded downwardly turned ends 35 and sharpened edges 36. The edges 36 lead the blades 33 when the body 10 is rotated in the proper direction and form obtuse angles 34 with lines 38 extending through the axes of bolts 32 and the centers of gravity 39 of the cutting units 30.

The bolts 32 are so located that the centers of gravity 39 of units 30 when in their extreme positions are substantially equally spaced radially inwardly and outwardly from a circle 66 whose center coincides with the center 67 of body 10 and which passes through the axes of the bolts 32.

The supporting arms 31 are guided at their outer ends for swinging motion in a plane parallel to the plane of the body 10 by means of keepers 60. These keepers are attached to the body 10 by means of bolts 61 and 62 which extend through said body, through spacers 63 between said body and keepers 60 and through said keepers. Tshse spacers serve as motion limiting means for limiting the inward and outward movement of the cutting units.

The marginal portions of the blades 33 are bent outwardly to form deflectors 64 which serve to throw out material in the path of travel of the blades 33 outwardly by centrifugal force. These deflectors extend outwardly beyond the ends of the sharpened edges 36 of blades 33.

The operation of the invention is as follows: When the cutter is rotating at normal speed, the cutting units 30 are swung outwardly by centrifugal force and swing on the bolts 32 outwardly until they engage spacers 63 on the bolts 62. The blades 30 are then disposed over every other depression 24 in body 10 as shown in full lines in FIG. 1. The sharpened edges 36 of blades 33 then slice through the grass or stems to be cut thus mowing the same in a simple and efficient manner. If one of the blades strikes a hard to cut stem, the first blade striking it may be moved inwardly and above the protective area 22 over the following projection 22 of body 10 and the following blade or blades giving the stem one or more additional whacks until the stem is severed. As soon as the cutter blades pass the stem being cut they fly outwardly by centrifugal force and act on the grass or stems in their path. If a stone or other object incapable of being cut is engaged by the end 35 of the cutter blade, the cutting unit is forced into protected position as previously described and if the object is not removed by the blade it is removed by engagement with the leading edge 25 of the following projection 22 of body 10.

The advantages of the invention are manifest. Much heavier grass or weeds can be cut than with the common fixed blade cutter. Loose objects in the path of the cutter are not thrown with great speed and distances from their location to cause injury to bystanders and others and are merely shoved to the side. The shape of the cutting units and the location of the bolts 32 produce the greatest and nearly uniform centrifugal force to swing the cutting units outwardly and effect positive cutting of the grass. A cutting blade striking a stone is quickly shifted to a protective position allowing the projections 22 and 23 following the blade engaged to strike the stone and shift it sidewise, thereby saving the other cutting units from injury. The ends of the blades extending outwardly beyond the cutting edges protect the cutting edges of the blades.

I claim:

1. A lawn mower cutter comprising:
   a. a rotary body having
   b. an undulating marginal edge forming:
   c. spaced alternating projections and recesses therebetween,
   d. a number of cutting units pivoted to said rotary body and having cutting means with sharpened edges adapted to swing outwardly beyond certain of said projections when said cutting means are in cutting position,
   e. said cutting units being adapted to move inwardly with the cutting means thereof in register with an adjacent projection to protect the same when said cutting means engages an object resisting cutting,
   f. the projection registering with the displaced cutting means engaging the object causing inward movement of the denoted cutting means, engaging the denote object to move the same out of the path of movement of the following cutting unit.

2. A lawn mower cutter according to claim 1 in which:
   a. the edges of the projections and recesses of the body are curved.

3. A lawn mower cutter according to claim 1 in which:

a. the projections on the body are twice as many in number as the number of cutting units.

* * * * *